Feb. 4, 1969  K. W. BULLIVANT ET AL  3,425,503
REGULATED LOAD CELL
Filed Dec. 21, 1967

INVENTORS.
KENNETH W. BULLIVANT
EDWARD KANE
BY  Seidel & Gonda

ATTORNEYS.

3,425,503
REGULATED LOAD CELL
Kenneth W. Bullivant, Pitman, and Edward Kane, Millville, N.J., assignors to Kane Air Scale Company, Glassboro, N.J., a corporation of New Jersey
Filed Dec. 21, 1967, Ser. No. 692,445
U.S. Cl. 177—208    5 Claims
Int. Cl. G01g 5/04

ABSTRACT OF THE DISCLOSURE

The balancing chamber in a load cell is in communication with the inlet and outlet chambers of a pressure-flow regulator. A restriction orifice is provided in a passage communicating the inlet chamber and the outlet chamber. The surface area of an expansible member defining the inlet and outlet chambers is greater in the outlet chamber than it is in the inlet chamber so as to provide a varying flow rate to the balancing chamber in a load cell.

---

This invention relates to a regulated load cell, and more particularly, to a load cell of the type disclosed in co-pending application Ser. No. 561,872, filed on June 30, 1966, now Patent No. 3,371,732. The disclosure in said application is incorporated herein by reference.

The load cell is designed on the force balance principle, that is, the weight being measured is null balanced in the net load chamber by air pressure acting on the effective area of an expansible element such as a diaphragm supported plate. The use of air as the transmitting and balancing medium eliminates all knife edges, levers and pivots. A tare balance chamber with a tare load diaphragm supported plate is provided to pneumatically counterbalance any portion of the total weight, such as the weight of the container.

The tare balance chamber is a separate chamber with its balance plate directly coupled to a center rod so that the regulated pressure in that chamber adds to the pressure in the net load chamber, thus carrying a fixed part of the weight or for supply to the load cell without affecting the net weight measurement. All moving parts are totally enclosed and protected from water, corrosive atmosphere, dirt, etc. Friction in the load cell is substantially eliminated by lack of any rubbing or rolling parts.

The total movement of the diaphragm system from 0 load to full load does not exceed .010 inch. A built-in mechanical stop is provided to carry large weight changes until the air pressure builds up to counterbalance the weight. This mechanical stop comes into play when the center rod moves downwardly a distance of .07 inch.

The load cell is coupled to a novel outlet pressure regulator which provides for a constantly varying flow rate in order to minimize travel of the valve member in the load cell balancing chamber. This in turn minimizes diaphragm deflection. Thus, the present invention preferably provides for a diaphragm deflection which is substantially less than .010 inch, such as .004 inch. It is known that the effective surface area of a diaphragm varies with the position of the diaphragm. When the diaphragm is in an up position, the effective surface area is reduced and when the diaphragm is in a down position, the effective surface area is increased with respect to the corresponding area when the diaphragm is in a free position.

This minimizing of travel is important for the net load diaphragm as well as for the tare weight diaphragm. Minimizing travel for the tare weight diaphragm is particularly important when the tare weight is large with respect to the net weight. By minimizing the travel of the diaphragm system, more accurate measurements are attainable. Also, it is possible to make measurements which include a substantially larger tare weight without any substantial loss of accuracy.

It is an object of the present invention to provide a more accurate pneumatic weight transmitter.

It is another object of the present invention to provide a pneumatic load cell wherein the diaphragm system has minimal travel.

It is another object of the present invention to provide a pneumatic load cell wherein the flow rate to the balancing chamber is varying with the balance system pressure due to an unbalanced flow regulator.

Other objects will appear hereinafter.

For the purpose of illustrating the invention, there is shown in the drawings a form which is presently preferred; it being understood, however, that this invention is not limited to the precise arrangements and instrumentalities shown.

Figure 1:
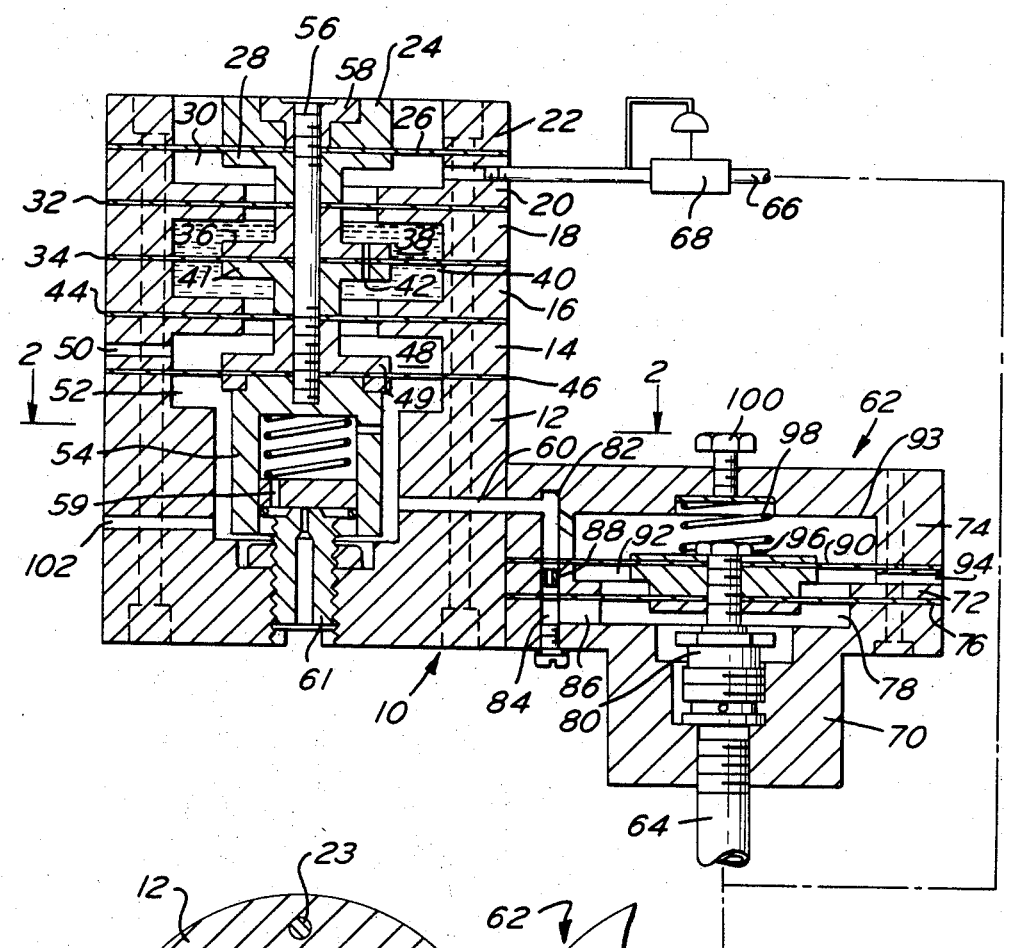
FIGURE 1 is a vertical sectional view of the present invention.
Figure 2:
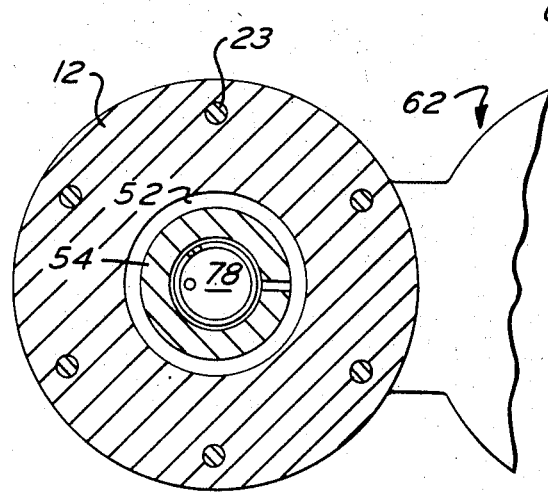
FIGURE 2 is a sectional view taken along the line 2—2 in FIGURE 1.

Referring to the drawings in detail, wherein like numerals indicate like elements, there is shown in FIGURE 1 a vertical sectional view of the regulator load cell of the present invention designated generally as 10. The load cell includes a housing comprised of a plurality of sections designated 12, 14, 16, 18, 20, and 22 superimposed over one another in that order. These sections are held together in assembled relationship by means of a plurality of bolts 23. Sections 14 and 20 are identical. Sections 16 and 18 are identical. Section 22 is an annular ring.

A weighing anvil 24 is provided on the upper surface of a tare load diaphragm 26. Diaphragm 26 has its periphery clamped between sections 22 and 20. A disc 28 is provided on the under surface of diaphragm 26 and provided with an axially extending boss on its lower surface. Diaphragm 26 defines the upper limit of a tare weight chamber 30.

Sections 18 and 20 have radially inwardly extending flanges. A diaphragm 32 is clamped between such flanges. Diaphragm 32 defines the lower surface of the tare weight chamber 30.

A diaphragm 34 has its periphery clamped between body sections 16 and 18. A disc 36 overlies the central portion of diaphragm 34. Disc 36 has an upwardly extending axial boss. The bosses on discs 28 and 36 engage opposite sides of the central portion of diaphragm 32. A first dampening chamber 38 is defined by the diaphragms 32 and 34.

A second dampening diaphragm 44 has its periphery clamped between sections 14 and 16 and radially inwardly directed flanges on said sections. A second dampening chamber 40 is defined by the diaphragms 34 and 44. A disc 41 is provided in chamber 40 with a downwardly directed axial boss contacting the upper surface of the central portion of diaphragm 44. A bleed passage 42 is provided in the discs 36 and 41. A lightweight oil base medium such as brake fluid is provided in the dampening chambers 38 and 40. The oil base medium may communicate between chambers 38 and 40 by means of the restricted bleed passage 42.

A net load diaphragm 46 has its periphery clamped between sections 12 and 14. A vent chamber 48 is defined by the diaphragms 44 and 46. Chamber 48 is vented to atmosphere by vent passage 50. A disc 49 is provided in chamber 48 overlying the central portion of diaphragm 46 with an upwardly directed axial boss contacting the lower surface on the central portion of diaphragm 44.

The net load diaphragm 46 defines the upper surface of a balancing chamber 52 in the housing section 12. An inverted cup-shaped cage 54 is disposed within chamber 50 with the lower edge of the cage spaced from the bottom of chamber 52.

All of the discs are identical except for the bleed passage 42. The bosses on the discs 28, 36, 41 and 49 are of the same diameter and are coaxial. A weight transmitting rod 56 extends from the anvil 24 to the cage 54 through each of the bosses and diaphragms described above. The lower end of rod 56 is threadedly coupled to the cage 54. The upper end of rod 56 is threadedly coupled to a nut 58 supported by the anvil 24.

A flat valve member 59 is provided in the cage 54. A bleed nozzle 61 is threadedly coupled to the bottom of housing section 12 so that one end of the nozzle is in the balancing chamber 52 for cooperation with the valve member 59. Valve member 59 and nozzle 61 control the rate of flow from chamber 52 to the atmosphere. A spring within cage 54 biases the valve member 59 toward the nozzle 61. Bleed passages are provided in the cage and valve member so as to equalize the pressure within the cage 54 with the pressure in chamber 52. A retainer is provided so as to define the lower limit of the valve member 59 with respect to its cage. Air is constantly being introduced into the chamber 52 and way of passage 60.

Passage 60 is coupled to a conduit 64 connected to a source of pressurized air by way of a regulator 62. Regulator 62. Regular 62 is an unbalanced outlet controlled flow regulator for providing a varying flow in proportion to the outlet pressure. Conduit 64 is also coupled to the tare weight chamber 30 by way of conduit 66 containing a conventional outlet pressure regulator 68.

The regulator 62 includes housing sections 70, 72 and 74. A diaphragm 76 has its outer periphery clamped between sections 70 and 72 to thereby define an inlet chamber 78. A valve 80 in chamber 78 controls flow from conduit 64 into chamber 78.

The housing sections of the regulator 62 have aligned passages. In section 70, the aligned passage is 84. In section 74, the aligned passage is 82. The aligned passage in section 72 is provided with a fixed restriction orifice 88. Passage 84 communicates with the inlet chamber 78 by way of passage 86.

A diaphragm 90 has its periphery clamped between sections 72 and 74 thereby defining a vent chamber 92 between the diaphragms 76 and 90. Chamber 92 is vented to atmosphere by way of vent passage 94. The diaphragms 76 and 90 have their central portions clamped together by plates held together in assembled relationship by means of a threaded bolt 96. The lower end of bolt 96 is an actuator for actuating valve 80. It will be observed that the surface area of diaphragm 76 exposed to chamber 78 is substantially less than the surface area diaphragm 90 exposed to the outlet chamber 93. As shown in FIGURE 1, chamber 93 is in constant communication with chamber 52 by way of passages 60 and 82.

The diaphragms 76 and 90 and the bolt 96 are biased downwardly in FIGURE 1 to a position of actuating valve 80 to introduce air into chamber 78. This bias is effected by spring 98 which can be adjusted by bolt 100. Bolt 100 is threadedly coupled to housing section 74. A flat plate is interposed between the lower end of bolt 100 and spring 98. Adjustment of spring 98 provides the means for correlating load cells made in accordance with the present invention so that they are identical in operating characteristics. A passage 102 may be provided in the housing section 12 for transmitting the pressure from chamber 52 to a gauge and/or control instrument by way of a conduit not shown.

The operation of the load cell of the present invention is as follows:

When a weight is placed on anvil 24, the force is transmitted through rod 56 to the cage 54, and through the spring in the cage to the valve member 59. This results in closing off flow from the balancing chamber 52 through nozzle 61 to the atmosphere. Pressure builds up in chamber 52 until it offsets the net load. Pressurized air is introduced into the tare weight chamber 30 by way of conduit 66 and pressure regulator 68 to offset the tare load. If the load is excessive, cage 54 contacts section 12.

As pressure builds up in the balancing chamber 52, it reaches a balancing point wherein it balances the net weight applied to the anvil 24. At this point, the pressure in chamber 52 will remain constant with any excess air introduced thereinto by way of conduit 60 escaping out of the nozzle 61 to atmosphere. The pressure in chamber 52, and hence the unknown net weight, can be read on a gauge calibrated at any suitable units and coupled to passage 102.

Due to the unbalanced surface areas on diaphragms 76 and 90 in regulator 62, such as 1.3–2 to 1, the flow rate from inlet chamber 78 to balancing chamber 52 is dependent on the pressure in chamber 52 and is increased for higher pressures therein. As a result thereof, the travel of the rod 56 and the diaphragm system of the load cell is minimized. Minimizing deflection of the diaphragms reduces the change in the effective surface area thereof, thereby increasing the accuracy of the weighing operation, eliminating non-linear characteristics of the diaphragm, and increasing the life expectancy of the diaphragms. Thus, instead of moving .01 inch to indicate a net load of 25 pounds on the anvil 24, the diaphragms of load cell may now only move .004 inch to indicate the same net load. It is apparent that the indication of a net load is by way of the pressure in chamber 52 rather than by any specific deflection of the diaphragms.

As used hereinafter, diaphragms as illustrated in the drawing and referred to above may be referred to as an expansible element or expansible means. Also, chamber 93 in the regulator 62 may be referred to hereinafter as a control chamber.

It is claimed:

1. Apparatus comprising a load cell having an anvil coupled to a valve member in a balancing chamber therein, a nozzle having one end in said chamber for cooperation with the valve member to control flow from said balancing chamber, a pressure regulator having its outlet communicating with said chamber, said regulator having an inlet chamber and a control chamber, each of the inlet chamber and control chamber communicating with said outlet, a restriction between said inlet chamber and said outlet, an inlet valve for controlling flow into said inlet chamber, expansible means between said inlet chamber and control chamber for actuating said inlet valve, the surface area of said expansible means exposed to said control chamber being substantially greater than the exposed area of said expansible means to said inlet chamber.

2. Apparatus in accordance with claim 1 wherein the surface area of the expansible means exposed to said control chamber is between 1.3 and 2 to 1 with respect to the surface area of said expansible means exposed to said inlet chamber.

3. Apparatus in accordance with claim 1 including an adjustable bias means for moving the expansible means toward said valve.

4. Apparatus comprising a pneumatic load cell having a weighing anvil coupled to a valve member located in a balancing chamber of the load cell, said load cell having a nozzle cooperating with said valve member to control flow from the balancing chamber, said anvil and valve member being supported within said load cell by diaphragms, and means for minimizing the deflection of diaphragms to eliminate non-linear characteristics of the diaphragms imposed by the amount of deflection of the diaphragms during the weighing operation, said means including a regulator for introducing pressurized air into the balancing chamber at a varying flow rate.

5. Apparatus in accordance with claim 4 wherein said regulator has a first diaphragm partially defining an inlet chamber, said regulator having a second diaphragm partially defining a control chamber, the inlet chamber and control chamber being in communication with said balancing chamber, the exposed surface area on said second diaphragm being greater than the exposed surface area on said first-mentioned diaphragm of the regulator.

References Cited

UNITED STATES PATENTS

| | | | |
|---|---|---|---|
| 3,147,616 | 9/1964 | Rome | 177—208 X |
| 3,177,958 | 4/1965 | Link | 177—208 |
| 3,179,192 | 4/1965 | Link | 177—208 |
| 3,339,650 | 9/1967 | Carr | 177—208 X |

RICHARD B. WILKINSON, *Primary Examiner.*

G. H. MILLER, Jr., *Assistant Examiner.*

U.S. Cl. X.R.

73—141